United States Patent Office

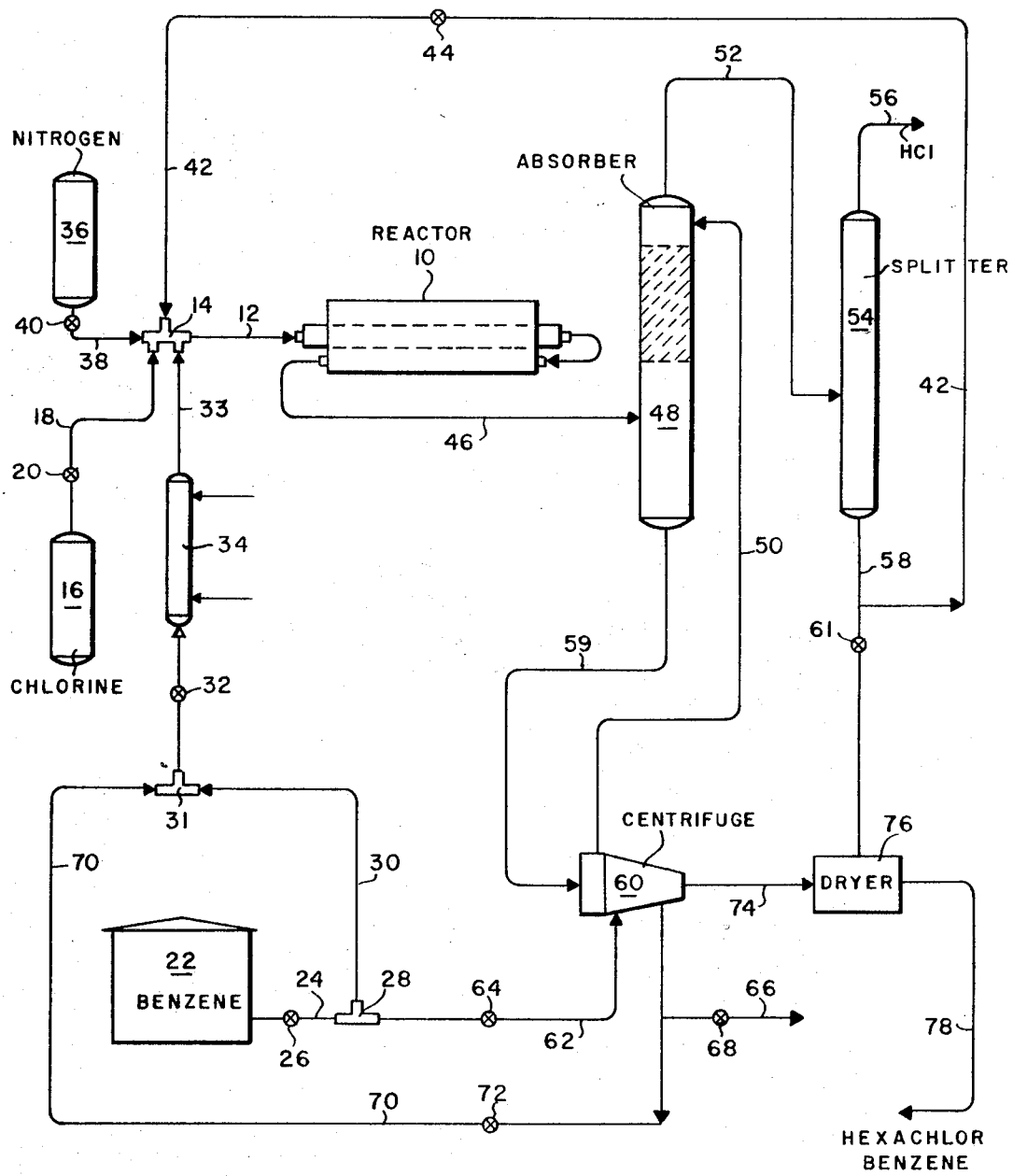

3,655,784
Patented Apr. 11, 1972

3,655,784
CHLORINATED BENZENE PRODUCTION
Simon Pierce Burns, Austin, Tex., assignor to Jefferson Chemical Company, Inc., Houston, Tex.
Filed Nov. 3, 1969, Ser. No. 873,588
Int. Cl. C07c 25/12
U.S. Cl. 260—650 R      2 Claims

ABSTRACT OF THE DISCLOSURE

Hexachlorobenzene is produced from benzene and chlorine by a vapor-phase process wherein a diluted mixture of benzene and chlorine are heated to a temperature of at least 400° C. to initiate a noncatalytic vapor-phase reaction.

BACKGROUND OF THE INVENTION

This invention relates to the production of hexachlorobenzene. It is known that hexachlorobenzene can be prepared by a liquid-phase reaction involving, for example, the liquid-phase reaction of chlorine with benzene in the presence of a catalyst. A representative process of this nature, for example, is shown in U.S. Pat. 2,777,003 and an alternate route is shown in U.S. Pat. No. 3,406,211. It has also been proposed to prepare chlorinated benzenes by "burning" benzene with chlorine in a visible flame reaction such as that disclosed in U.S. Pat. 3,234,295.

Hexachlorobenzene is useful as a raw material in the preparation of pentachlorophenol and as a raw material for the preparation of fire-resistant polyesters and polyurethane foams.

For uses such as this, it is desirable to provide hexachlorobenzene substantially free from carbon contamination (a serious problem in connection with the "flame" process mentioned above) and substantially free from metal impurities of the type picked up by the reactor effluent in trace amounts when a liquid-phase catalytic process is used.

SUMMARY OF INVENTION

In contrast to the teachings of the prior art, I have unexpectedly discovered that it is not only possible to obtain hexachlorobenzene from chlorine and benzene by a flame-free noncatalytic high-temperature vapor-phase process but that the reaction product that is formed is predominantly hexachlorobenzene and, moreover, that under properly correlated reaction conditions it is possible to obtain a high yield of very pure hexachlorobenzene.

Since my invention relates to a new process which is operated in contradistinction to the teachings of the prior art, my experimental investigation of the process has been directed to the "central core" of the invention in order that I may be able to describe what I believe to be the preferred embodiment of the invention and the best mode by which it may be carried out on a commercial scale. This has been done with a view to making the best mode of my invention available to the public in the form of a printed patent since the outer perimeters of the invention can readily be ascertained by one of ordinary skills in the art by routine experimentation. In this connection I wish to point out that although additional experimentation is within the routine skill of one of ordinary skill of the art, a full and comprehensive evaluation of all of the peripheral aspects of my invention would be both time consuming and expensive and, I believe, unnecessary except for scientific curiosity.

Briefly, the "central core" of my invention may be described as the noncatalytic reaction at a temperature of at least about 400° C. of a diluted vapor-phase mixture of benzene and chlorine. A non-reacting gas is used as a diluent, such as the so-called "inert" gases such as nitrogen and the noble gases. An independent and highly significant discovery of mine is that hydrogen chloride, a by-product of the process, is a non-reacting gas in my process and may be employed as a diluent gas. In fact, in accordance with the preferred embodiment of my present invention, the preferred diluent gas is extraneously added or internally generated hydrogen chloride or both. Mixtures of hydrogen chloride and nitrogen can be used as a diluent.

DESCRIPTION OF THE PREFERRED EMBODIMENT

In accordance with the preferred embodiment of my invention, a gaseous mixture of chlorine, beneznea and a gaseous diluent such as nitrogen or hydrogen chloride is noncatalytically heated to a temperature within the range of about 650° to about 800° C., and more preferably to a temperature within the range of about 650° to about 750° C. From about 6 to about 60 mols of chlorine and about 6 to about 60 mols of a non-reacting diluent gas are employed to a mol of benzene. Preferably, I use from about 20 to about 60 mols of chlorine, and more preferably, from about 20 to 30 mols of chlorine per mol of benzene and, in like manner, from about 20 to about 50 mols of diluent gas and more preferably from about 20 to about 30 mols of diluent gas per mol of benzene.

When a gaseous mixture, as aforesaid, is heated in the indicated manner, a noncatalytic reaction is initiated resulting in a substantially quantitative conversion of the benzene. There is no visible flame, such as occurs when decomposition to carbon occurs. Thus, the present invention has the dual advantage of avoiding or minimizing carbon contamination of the reaction product, and also avoiding conversion of the benzene to less useful by-products such as carbon tetrachloride.

The reaction is a very "fast reaction" and is normally completed within less than one second of contact time within the indicated temperature range. In accordance with the preferred embodiment of my invention the contact time is less than one second, such as a contact time of about 0.2 to about 0.5 second.

The preferred embodiment of my invention will be further illustrated in connection with the accompanying drawing which is a schematic flow sheet illustrating a preferred embodiment of my invention for the continuous production of hexachlorobenzene.

Turning now to the drawing, there is schematically shown a tubular reactor 10 to which a diluted gaseous mixture of benzene and chlorine is charged by way of a line 12 from a manifold 14.

Chlorine from a suitable source, such as storage tank 16 is charged to the manifold 14 by way of a line 18 controlled by a valve 20. Benzene from a suitable source such as a storage tank 22 is charged by way of a line 24 controlled by a valve 26 to a manifold 28; from thence by way of a line 30 to a manifold 31 and thence, by a line 33 by a valve 32 and containing a preheater 34 to the manifold 14. The purpose of the preheater 34 is to vaporize a normally liquid benzene in the tank 22 before it is charged to the manifold 14.

In acordance with the preferred embodiment of my invention, these are the only raw materials that are charged. However, if desired, all or a portion of the diluent gas may be supplied by using an extraneously supplied non-reacting gas such as nitrogen which is obtained from a suitable source such as a storage tank 36 and charged to the manifold 14 by way of a charge line 38 controlled by a valve 40.

Recycled diluent gas and recycled chlorine, obtained in the manner to be described, are also charged to the manifold 14 by way of a recycle line 42 controlled by a valve 44.

Preferably, the gaseous mixture charged to the reactor 10 from the manifold 14 by way of a line 12 will contain about 20 to 25 mols of chlorine and about 20 to 25 mols of diluent gas per mol of benzene. Preferably, the reactor 10 is maintained at a temperature of about 650°–750° C. and the flow rate of the gaseous mixture charged by way of the line 12 to the reactor 10 is regulated so as to provide for a contact time within the reactor of less than about one second such as a contact time of about 0.25 to about 0.4 second.

As indicated, a noncatalytic substantially complete conversion of benzene by reaction with the chlorine will occur within the reactor 10. As a consequence, the gaseous effluent charged from the reactor 10 by way of a line 46 will comprise hexachlorobenzene in hydrogen chloride as the principal reaction product, chlorine, unreactive diluent gas and, possibly, small amounts of benzene and carbon.

Reactor effluent 46 is collected in process in any suitable manner so as to obtain the hexachlorobenzene reaction product, unreacted chlorine, by-product hydrogen chloride, etc.

In accordance with the preferred embodiment of my invention, the reactor effluent 46 is charged to a product adsorber 48 where it is conutercurrently contacted with a chlorinated benzene wash solvent introduced to the adsorber 48 by a line 50 in a manner to permit countercurrent contacting of the solvent and the gaseous effluent.

The gaseous effluent from the adsorber 48 will be composed principally of hydrogen chloride by-product, chlorine and non-reacting diluent, if any, and is discharged by way of a line 52 leading to a splitter 54. The splitter 54 is operated so as to remove all or a portion of the by-product hydrogen chloride by way of a line 56, the remainder of the effluent being discharged by way of the line 58 controlled by a valve 60 for discharge from the system or for recycle by way of the recycle line 42 controlled by the valve 44, as aforesaid.

Returning now to the product adsorber 48, a liquid suspension of a particulate hexachlorobenzene in chlorinated benzene solvent wash is obtained which is discharged by way of a line 59 leading to a centrifuge 60 of any suitable construction wherein the hexachlorobenzene is separated from the liquid. For example, a bowl-type centrifuge as schematically illustrated in the drawing may be used. In accordance with this embodiment, fresh benzene is charged to the centrifuge 60 by way of a line 62 controlled by a valve 64 leading from the manifold 28 in order to "wash" the hexachlorobenzene filter cake. A portion of the benzene wash is discharged from centrifuge 60 by way of a line 66 controlled by a valve 68 for discharge from the system, or, more preferably, for recycle to the manifold 31 by way of a recycle line 70 controlled by a valve 72.

Another portion of the benzene "wash" is used as the source of solvent 50 for the product adsorber 48.

The hexachlorobenzene filter cake is conveyed from the centrifuge 60 by way of a line 74 to a drier 76 and from thence by way of a conveyer 78 to product storage.

Experimental evaluation

My invention, and particularly the preferred central core embodiment thereof, is further illustrated by the following specific examples which are given by way of illustration and not as limitations of the scope of this invention. Where parts are mentioned they are parts by weight.

EXAMPLE I

The reactor was a 21-inch long by 25 mm. inside diameter tube reactor which was electrically heated and connected to a water adsorber collection system. The feeds were premixed and fed continuously to one end of the tube. Benzene was fed at the rate of 32.5 grams per hour and the overall feed mol ratio was: benzene 1.0 mol, chlorine 23.9 mols, nitrogen 22.8 mols. The maximum reactor temperature was 710° C. The product was a white, crystalline solid. The overall yield of hexachlorobenzene based on benzene was over 90 mol percent.

Example I illustrates a preferred embodiment of the present invention. The effect of temperature upon the efficiency of the reaction is illustrated, for example, in the following tables wherein Example I was essentially repeated except for the use of a different temperature range. The temperatures employed and the results obtained are summarized in Table I.

TABLE I

| Run: | Minimum temperature, °C. | Maximum temperature, °C. | Yield [1] | Product color |
|---|---|---|---|---|
| A | 345 | 630 | | No reaction. |
| B | 400 | 575 | 16 | Light tan color. |
| C | 625 | 670 | 89 | Do. |
| D | ca 500 | 795 | 81 | Yellow color. |
| E | ca 500 | 760 | 100 | White. |
| Example I | ca 500 | 710 | 90 | Do. |

[1] Mol percent hexachlorobenzene.

Effect of chlorine to benzene mol ratio

The effect of the mol ratio of chlorine to benzene on the course of the reaction is illustrated in connection of a number of experiments which were essential duplicates of Example I except for the use of different mol ratio of chlorine to benzene. The different mol ratios and the results obtained are tabularly set forth in Table II.

TABLE II

| Run: | Mols Cl$_2$/mol benzene | Yield [1] | Product color |
|---|---|---|---|
| F | 4.6 | 61 | Brown color. |
| G | 8.6 | 81 | Yellow color. |
| H | 17.0 | 81 | Off-white. |
| J | 23.9 | ([2]) | White. |
| Example I | 23.9 | 90 | Do. |

[1] Mol percent hexachlorobenzene.
[2] Not determined.

Effect of diluent

The effect of diluent concentration on the course of the reaction is illustrated by the following examples which were using different mol ratios of diluent to benzene, as shown in Table III. The mol ratios employed and the results obtained are set forth in Table III.

TABLE III

| Run | Mols Benzene | Mols Cl$_2$ | Mols N$_2$ | Yield | Product color |
|---|---|---|---|---|---|
| K | 1 | 23.9 | 1.6 | 33.3 | Gray-black. |
| L | 1 | 23.9 | 1.6 | 37.2 | Do. |
| M | 1 | 23.9 | 22.8 | 75 | Light tan. |

Use of hydrogen chloride as a diluent

As has been stressed heretofore, one very surprising discovery that I have made is that hydrogen chloride is a non-reacting gas in my reaction although it is normally considered a reactant in other processes wherein hexachlorobenzene is produced. Therefore, one would expect hydrogen chloride to prevent the reaction from going to completion.

EXAMPLE II

The reactor was a 21 inch by 25 mm. Vycor tube reactor which was electrically heated. The feeds were premixed and fed continuously to the top end of the reactor. Benzene was fed at a rate of 32 grams per hour and the mol ratios of the feed streams were: benzene 1.0 mol, chlorine 23.9 mols and hydrogen chloride 22.3 mols. The product was an almost white, crystalline solid. The overall yield of hexachlorobenzene based on benzene was 88 mol percent. The maximum reactor temperature was over 680° C.

I claim:

1. A flame free, noncatalytic process for the preparation of hexachlorobenzene which comprises heating a mixture of benzene and chlorine in the presence of a diluent in vapor phase to a temperature of 650° to 800° C. for a contact time of less than one second and recovering hexachlorobenzene as a product of the flame free, noncatalytic process wherein said diluent is selected from the group consisting of nitrogen, hydrogen chloride and mixture thereof and wherein from about 6 to about 60 mols of chlorine and about 6 to about 60 mols of said diluent are employed per each mol of benzene.

2. A process according to claim 1 wherein said nonreacting diluent consists essentially of hydrogen chloride, wherein about 20 to 30 mols of chlorine and about 20 to 30 mols of hydrogen chloride are employed per each mol of benzene, and wherein said temperature is maintained within the range of about 650° C. to about 750° C.

References Cited

UNITED STATES PATENTS

| | | | |
|---|---|---|---|
| 3,234,295 | 2/1966 | Sprauer | 260—654 H |

FOREIGN PATENTS

| | | | |
|---|---|---|---|
| 919,886 | 11/1954 | Germany | 260—650 R |
| 1,632 | 3/1963 | Japan | 260—650 R |
| 1,106,763 | 12/1955 | France | 260—650 R |

HOWARD T. MARS, Primary Examiner